(12) United States Patent
Rathay et al.

(10) Patent No.: US 10,753,207 B2
(45) Date of Patent: Aug. 25, 2020

(54) AIRFOIL WITH TIP RAIL COOLING

(71) Applicant: General Electric Company, Schenectady, NY (US)

(72) Inventors: Nicholas William Rathay, Rock City Falls, NY (US); Thomas Earl Dyson, Niskayuna, NY (US); Brendon James Leary, Simpsonville, SC (US); Gregory Terrence Garay, West Chester, OH (US); Gustavo Adolfo Ledezma, Delmar, NY (US); David Wayne Weber, Simpsonville, SC (US); Aaron Ezekiel Smith, Montgomery, OH (US)

(73) Assignee: General Electric Company, Schenectady, NY (US)

( * ) Notice: Subject to any disclaimer, the term of this patent is extended or adjusted under 35 U.S.C. 154(b) by 513 days.

(21) Appl. No.: 15/648,564

(22) Filed: Jul. 13, 2017

(65) Prior Publication Data

US 2019/0017389 A1 Jan. 17, 2019

(51) Int. Cl.
*F01D 5/18* (2006.01)
*F01D 5/20* (2006.01)

(52) U.S. Cl.
CPC ............... *F01D 5/186* (2013.01); *F01D 5/20* (2013.01); *F05D 2220/30* (2013.01); *F05D 2240/307* (2013.01); *F05D 2260/201* (2013.01); *F05D 2260/202* (2013.01); *F05D 2260/205* (2013.01)

(58) Field of Classification Search
CPC ...... F01D 5/186; F01D 5/20; F05D 2260/202; F05D 2260/205; F05D 2220/30; F05D 2240/307; F05D 2260/201
See application file for complete search history.

(56) References Cited

U.S. PATENT DOCUMENTS

| 6,164,914 | A | * | 12/2000 | Correia | F01D 5/186 |
|---|---|---|---|---|---|
| | | | | | 415/115 |
| 7,922,451 | B1 | | 4/2011 | Liang | |
| 7,997,865 | B1 | | 8/2011 | Liang | |
| 8,079,811 | B1 | | 12/2011 | Liang | |
| 8,172,507 | B2 | | 5/2012 | Liang | |
| 8,182,221 | B1 | | 5/2012 | Liang | |

(Continued)

FOREIGN PATENT DOCUMENTS

| DE | 19944923 A1 | 3/2001 |
|---|---|---|
| EP | 1762701 B1 | 4/2014 |

(Continued)

OTHER PUBLICATIONS

Canadian Intellectual Property Office; Office Action in Canadian Patent Application No. 3,009,739; dated May 8, 2019; 3 pages; Canada.

(Continued)

*Primary Examiner* — Xiao En Mo
(74) *Attorney, Agent, or Firm* — McGarry Bair PC (57) ABSTRACT

An apparatus and method for cooling an airfoil tip for a turbine engine can include a blade, such as a cooled turbine blade, having a tip rail extending beyond a tip wall (94) enclosing an interior for the airfoil at the tip. A plurality of film-holes can be provided in the tip rail. A flow of cooling fluid can be provided through the film-holes from the interior of the airfoil to cool the tip of the airfoil.

32 Claims, 8 Drawing Sheets

(56) References Cited

U.S. PATENT DOCUMENTS

| | | | |
|---|---|---|---|
| 8,366,394 B1 | 2/2013 | Liang | |
| 8,469,666 B1 | 6/2013 | Liang | |
| 8,777,567 B2 | 7/2014 | Poon et al. | |
| 8,801,377 B1 * | 8/2014 | Liang | F01D 5/186 416/97 R |
| 9,188,012 B2 | 11/2015 | Lacy et al. | |
| 9,249,670 B2 | 2/2016 | Bunker | |
| 9,273,561 B2 | 3/2016 | Lacy et al. | |
| 9,429,027 B2 | 8/2016 | Mongillo, Jr. et al. | |
| 9,464,529 B2 | 10/2016 | Zambetti et al. | |
| 2014/0178207 A1 * | 6/2014 | He | F01D 5/20 416/96 R |
| 2015/0104327 A1 | 4/2015 | Malak et al. | |
| 2016/0265366 A1 * | 9/2016 | Snyder | B23K 26/342 |

FOREIGN PATENT DOCUMENTS

| | | |
|---|---|---|
| JP | 2001073704 A | 3/2001 |
| JP | 2013124665 A | 6/2013 |

OTHER PUBLICATIONS

Japanese Patent Office; First Office Action in Japanese Patent Application No. 2018-131149; dated Aug. 27, 2019; 3 pages; Japan.

* cited by examiner

AIRFOIL WITH TIP RAIL COOLING

BACKGROUND OF THE INVENTION

Turbine engines, and particularly gas or combustion turbine engines, are rotary engines that extract energy from a flow of combusted gases passing through the engine onto a multitude of rotating turbine blades, and in some cases, such as aircraft, generate thrust for propulsion. Heavy frame gas turbines are also commonly used to drive electric generators for power generation.

Gas turbine engines are designed to operate at high temperatures to maximize engine efficiency, so cooling of certain engine components, such as a high pressure turbine and a low pressure turbine, can be beneficial. Typically, cooling is accomplished by ducting cooler air from high and/or low pressure compressors to the engine components that require cooling. Temperatures in the high pressure turbine can be 1000° C. to 2000° C. and the cooling air from the compressor can be 500° C. to 700° C., enough of a difference to cool the high pressure turbine.

Contemporary turbine blades, as well as vanes or nozzles, generally include one or more interior cooling circuits for routing the cooling air through the blade to cool different portions of the blade, and can include dedicated cooling circuits for cooling different portions of the blade, such as the leading edge, trailing edge and tip of the blade.

Turbine blade squealer tip rails in particular help to reduce aero losses and therefore increase the efficiency of turbine engines. The tip rail is subjected to a high heat loads and is difficult to effectively cool. It is frequently one of the hottest regions on the blade.

BRIEF DESCRIPTION OF THE INVENTION

In one aspect, the disclosure relates to an airfoil for a turbine engine, the airfoil comprising a body defining an interior, and extending axially between a leading edge and a trailing edge to define a chord-wise direction and radially between a root and a tip to define a span-wise direction, which terminates in a tip wall and a tip rail extending from the tip wall, at least one cooling passage formed in the interior, at least one cooling cavity provided within the tip rail and comprising at least one cooling conduit defining a flow path having a centerline intersecting with a first surface of the cooling cavity and fluidly coupled to the cooling passage, and at least one film-hole having an inlet fluidly coupled to the at least one cooling cavity at a second surface opposite the first surface and an outlet provided on an exterior surface of the tip rail.

In another aspect, the disclosure relates to a blade for a turbine engine, the blade comprising a body defining an interior, and extending axially between a leading edge and a trailing edge to define a chord-wise direction and radially between a root and a tip to define a span-wise direction, which terminates in a tip wall and a tip rail extending from the tip wall, at least one cooling passage formed in the interior, at least one cooling cavity provided within the tip rail and comprising at least one cooling conduit defining a flow path having a centerline intersecting with a first surface of the cooling cavity and fluidly coupled to the cooling passage, and at least one film-hole having an inlet fluidly coupled to the at least one cooling cavity at a second surface opposite the first surface and an outlet provided on an exterior surface of the tip rail.

In yet another aspect, the disclosure relates to a method of cooling a tip rail of an airfoil for a turbine engine, the method comprising impinging a cooling fluid through a flow path onto a first surface of a cooling cavity within the tip rail, and exhausting at least a portion of cooling fluid through at least one film-hole having an inlet provided on a second surface of the cooling cavity opposite the first surface and extending to an outlet in the tip rail.

DETAILED DESCRIPTION OF THE INVENTION

Aspects of the disclosure described herein are directed to a tip of an airfoil including cooling cavities having a first surface that receives impingement cooling and a second surface opposite the first surface having a film-hole through which cooling air is exhausted. For purposes of illustration, the present disclosure will be described with respect to a blade for a turbine in an aircraft gas turbine engine. It will be understood, however, that aspects of the disclosure described herein are not so limited and may have general applicability within an engine, including compressors, as well as in non-aircraft applications, such as other mobile applications and non-mobile industrial, commercial, and residential applications.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine or being relatively closer to the engine outlet as compared to another component.

Additionally, as used herein, the terms "radial" or "radially" refer to a dimension extending between a center longitudinal axis of the engine and an outer engine circumference. A "set" as used herein can include any number of a particular element, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

Figure 1:
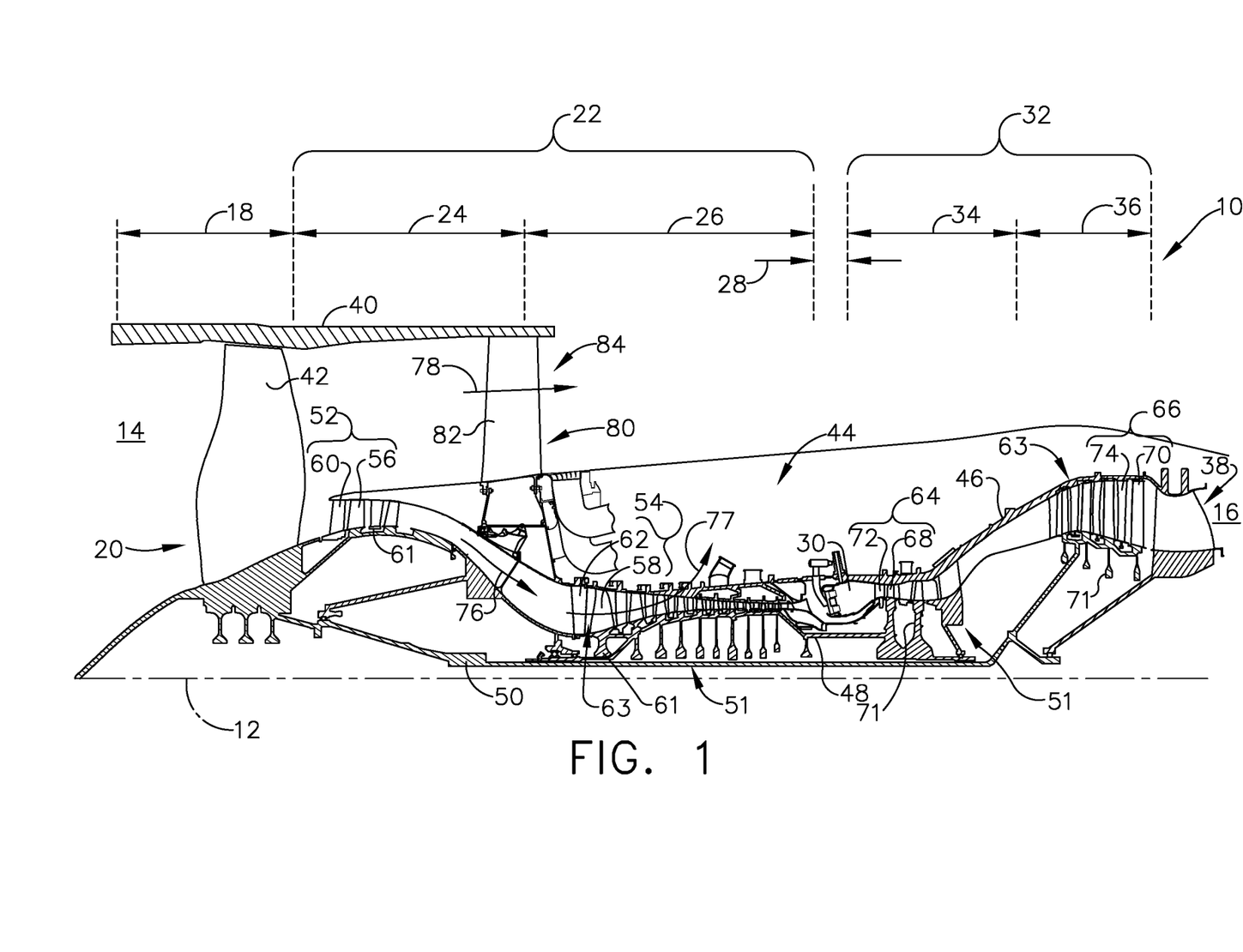
FIG. 1 is a schematic cross-sectional diagram of a portion of a turbine engine for an aircraft.

FIG. 1 is a schematic cross-sectional diagram of a portion of a gas turbine engine 10 for an aircraft. The engine 10 has a longitudinally extending axis or centerline 12 extending from forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12 and rotatable within the fan casing 40. The HP compressor 26, the combustor 30, and the HP turbine 34 form a core 44 of the engine 10, which generates and extracts energy from combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to a disk 61, which is mounted to the corresponding one of the HP and LP spools 48, 50, with each stage having its own disk 61. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50, with each stage having a dedicated disk 71. The vanes 72, 74 for a stage of the compressor can be mounted to the core casing 46 in a circumferential arrangement.

Complementary to the rotor portion, the stationary portions of the engine 10, such as the static vanes 60, 62, 72, 74 among the compressor and turbine section 22, 32 are also referred to individually or collectively as a stator 63. As such, the stator 63 can refer to the combination of non-rotating elements throughout the engine 10.

In operation, the airflow exiting the fan section 18 is split such that a portion of the airflow is channeled into the LP compressor 24, which then supplies pressurized air 76 to the HP compressor 26, which further pressurizes the air. The pressurized air 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and are ultimately discharged from the engine 10 via the exhaust section 38. The driving of the LP turbine 36 drives the LP spool 50 to rotate the fan 20 and the LP compressor 24.

A portion of pressurized airflow 76 generated in the compressor section 22 can be drawn from the compressor section 22 as bleed air 77. The bleed air 77 can be drawn from the pressurized airflow 76 and provided to engine components requiring cooling. The temperature of pressurized airflow 76 entering the combustor 30 is significantly increased. As such, cooling provided by the bleed air 77 is necessary for operating of such engine components in the heightened temperature environments.

A remaining portion of airflow 78 from the fan section 18 bypasses the LP compressor 24 and engine core 44 and exits the engine assembly 10 through a stationary vane row, and more particularly an outlet guide vane assembly 80, comprising a plurality of airfoil guide vanes 82, at a fan exhaust side 84. More specifically, a circumferential row of radially extending airfoil guide vanes 82 is utilized adjacent the fan section 18 to exert some directional control of the airflow 78.

The airflow 78 can be a cooling fluid used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
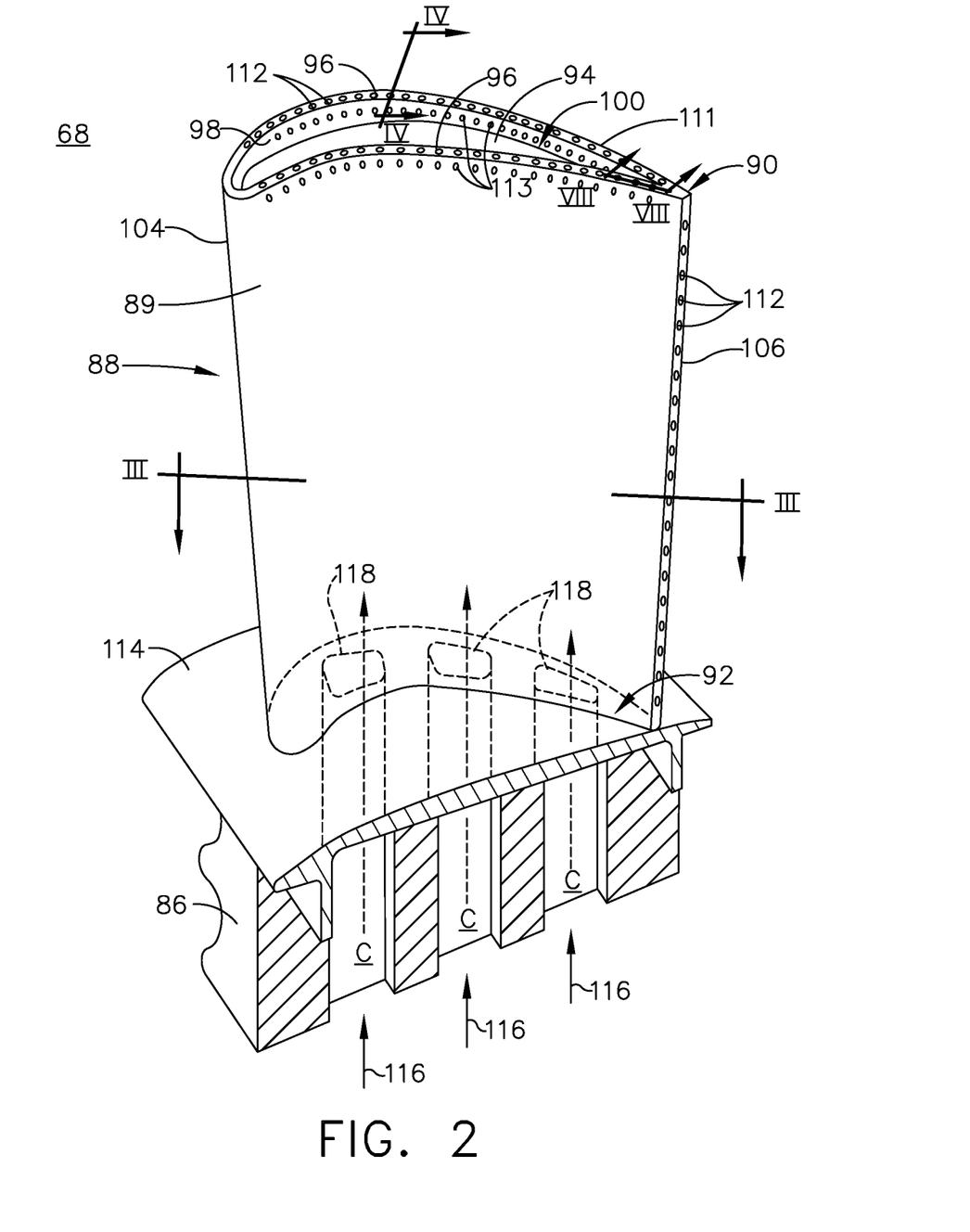
FIG. 2 is an isometric view of an airfoil for the engine of FIG. 1 including a tip rail with cooling holes.

Referring to FIG. 2, an engine component in the form of one of the turbine blades 68 includes a dovetail 86 and an airfoil 88. The airfoil 88 includes a body 89 spanning from a tip 90 to a root 92 to define a span-wise direction there between. A tip wall 94 is provided at the tip 90, with a tip rail 96 having an exterior surface 98 and extending from the tip wall 94 to define a tip plenum 100. The tip rail 96 and tip plenum 100 are also known as a squealer tip rail and squealer pocket. The airfoil further includes a leading edge 104 and a trailing edge 106 defining a chord-wise direction there between. A plurality of film-holes 112 are provided along a distal end 111 of the tip rail 96 and can also be provided in the span-wise direction along the trailing edge 106 of the airfoil 88. Furthermore, a second set of film-holes 113 can be provided along the exterior surface 98 of the tip rail 96.

The airfoil 88 mounts to the dovetail 86 by way of a platform 114 at the root 92. The platform 114 helps to radially contain a turbine engine mainstream airflow driven by the blade 68. The dovetail 86 can be configured to mount to a turbine rotor disk on the engine 10 to drive the blade 68. The dovetail 86 further includes at least one inlet passage 116, with the exemplary dovetail 86 shown as a having three inlet passages 116. The inlet passages 116 extend through the dovetail 86 and the platform 114 to provide internal fluid communication with the airfoil 88 at corresponding passage outlets 118. A flow of cooling fluid C, such as airflow 77 and/or airflow 78 can be provided to the airfoil 88 through the inlet passage 116. It should be appreciated that the inlet dovetail 86 is shown in cross-section, such that the inlet passages 116 are enclosed within the body of the dovetail 86.

Figure 3:
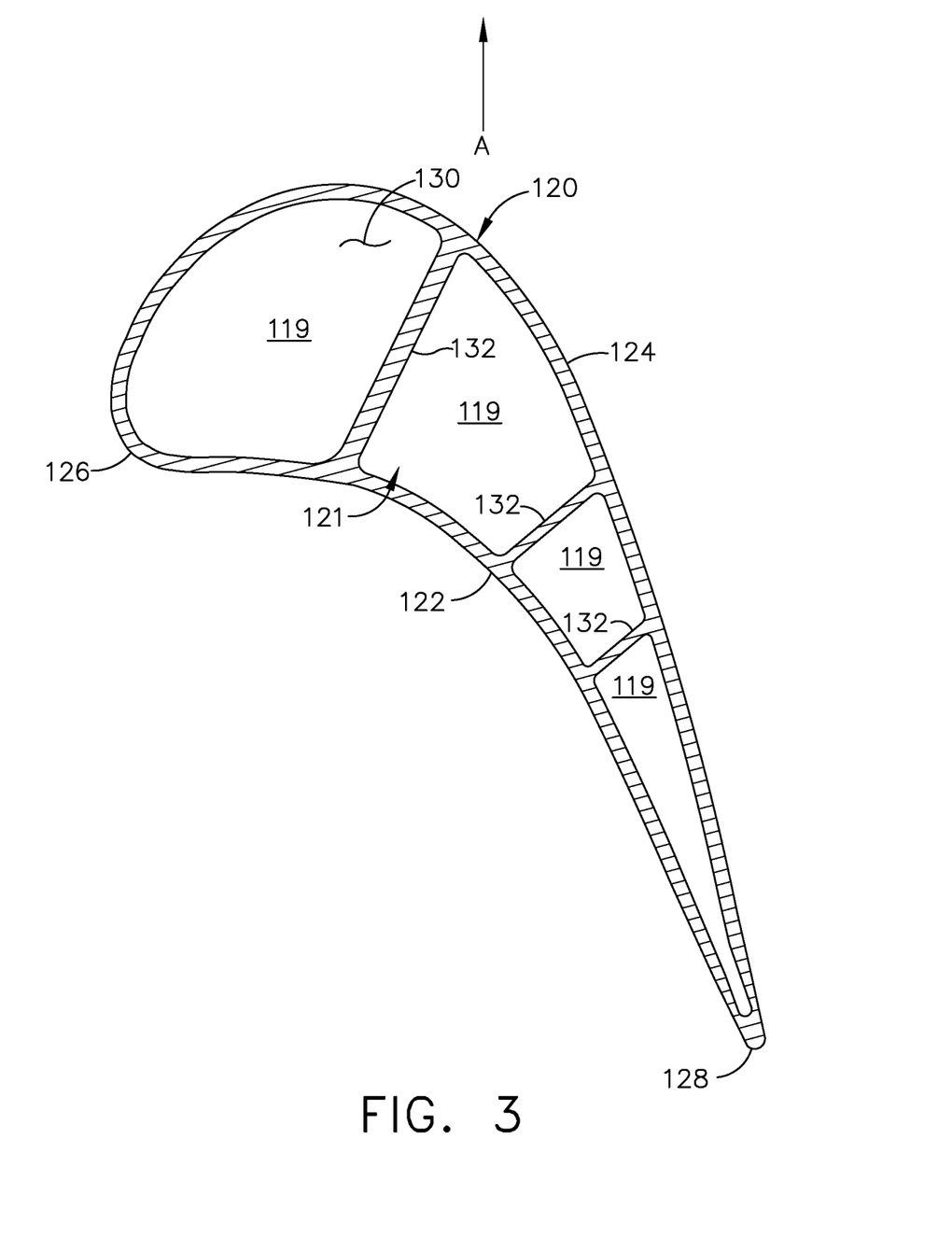
FIG. 3 is section view of the airfoil of FIG. 2 taken across section illustrating cooling passages within the airfoil.

Referring now to FIG. 3, the airfoil 88 includes an outer wall 120 with a concave-shaped pressure side 122 and a convex-shaped suction side 124 joined together to define the shape of airfoil 88. During operation, the airfoil 88 rotates in a direction such that the pressure side 122 follows the suction side 124. Thus, as shown in FIG. 3, the airfoil 88 would rotate upward toward the top of the page in the direction of arrow (A).

An interior 130 is defined by the outer wall 120. One or more interior walls shown as ribs 132 can divide the interior 130 into multiple cooling passages 119. Each of the passage outlets 118 can be fluidly coupled to one or more internal cooling passages 119. The inlet passages 116, passage outlets 118, internal cooling passages 119, and film-holes 112, can be fluidly coupled to each other and form one or more cooling circuits 121 within the airfoil 88.

It should be appreciated that the interior structure of the airfoil 88 is exemplary as illustrated. The interior 130 of the airfoil 88 can be organized in a myriad of different ways, and the cooling passages 119 can include single passages extending in the span-wise direction, or can be complex cooling circuits, having multiple features such as passages, channels, inlets, outlets, ribs, pin banks, circuits, sub-circuits, film-holes, plenums, mesh, turbulators, or otherwise in non-limiting examples. Preferably, the cooling passages 119 will be in fluid communication with the inlet passages 116 of the dovetail 86. At least one of the cooling passages 119 is in fluid communication with the film-holes 112.

Figure 4:
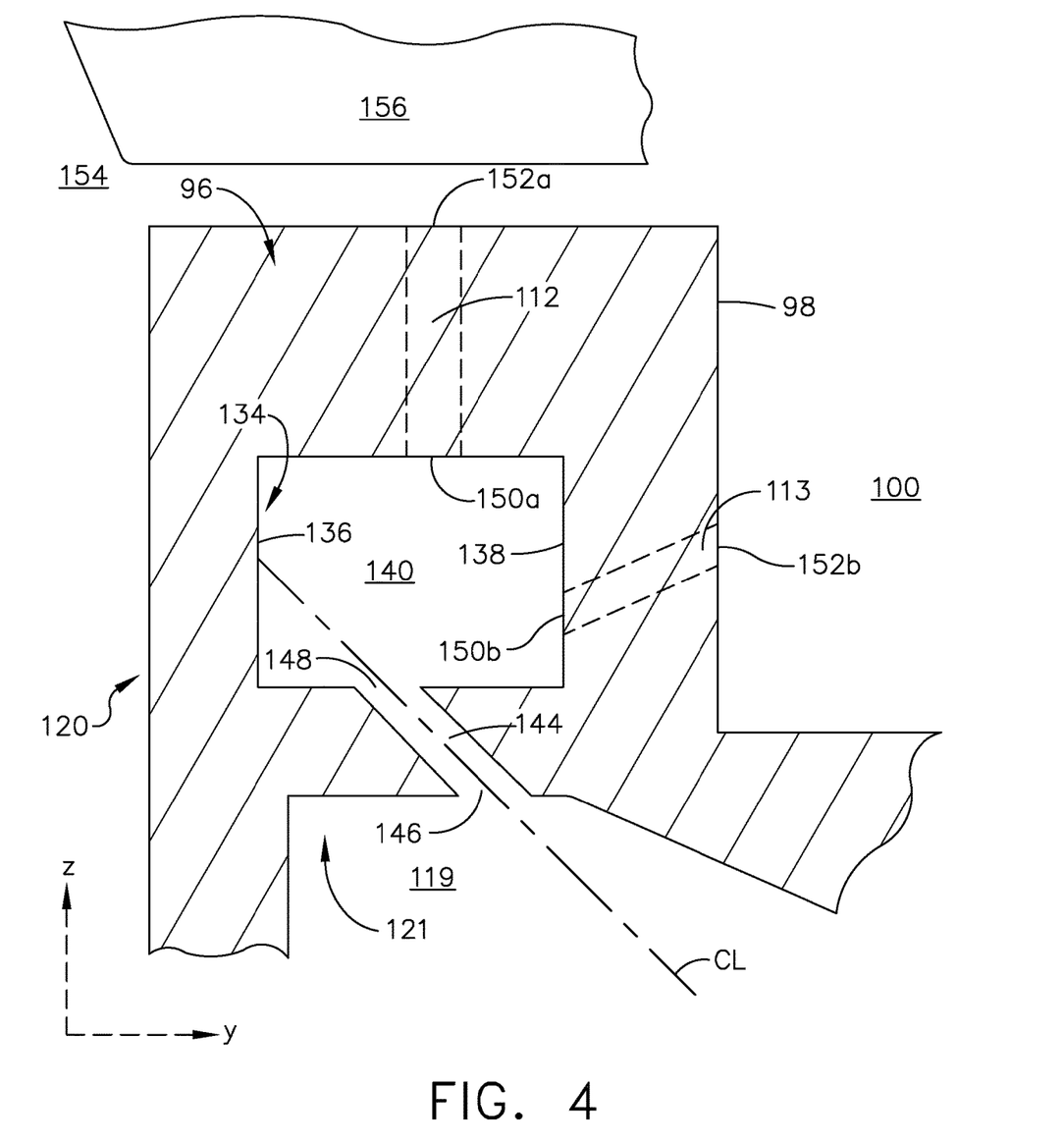
FIG. 4 is a section view of the tip rail of the airfoil of FIG. 2 taken across section IV-IV illustrating cooling cavities within the tip rail.

As can be seen more clearly in FIG. 4, a cross-section of the tip rail 96 taken across IV-IV of FIG. 2 depicts at least one cooling cavity 140 to define a portion of the cooling circuit 121 as described herein. A set of walls 134 defining the at least one cooling cavity 140 includes a first surface 136 opposite a second surface 138. It is contemplated that the at least one cooling cavity 140 can be multiple cooling cavities (FIG. 8) extending throughout the tip rail 96, or can be one continuous cooling cavity 140 extending along a length the tip rail 96.

A cooling conduit 144 having an inlet 146 fluidly coupled to the cooling passage 119 extends to an outlet 148 fluidly coupled to the at least one cooling cavity 140. The cooling conduit 144 is oriented such that a centerline (CL) of the cooling conduit 144 intersects with the first surface 136. It is contemplated that the cooling conduits 144 are multiple cooling conduits such that a plurality of cooling conduits 144 are formed between the cooling passage 119 and the at least one cooling cavity 140. It should be understood that the cooling conduit 144 can be formed in any manner or geometry where the centerline (CL) intersects the first surface 136 opposite the second surface 138.

The plurality of film-holes 112 provided along the distal end 111 of the tip rail 96 can include a film-hole inlet 150a fluidly coupled to cooling cavity 140 and a film-hole outlet 152a fluidly coupled to an air source 154 surrounding the airfoil 88.

The second set of film-holes 113 provided along the exterior surface 98 of the tip rail 96 can extend from a film-hole inlet 150b to a film-hole outlet 152b. The second set of film-holes 113 is non-aligned in a chord-wise direction with the cooling conduit 144. More specifically, the second set of film holes 113 and the at least one cooling conduit 144 are not in the same plane as illustrated with dotted and solid lines respectively. The film-hole inlet 150b is fluidly coupled to cooling cavity 140 along the second surface 138 opposite the first surface 136. The film-hole outlet 152b is fluidly coupled to the air source 154 within the tip plenum 100.

It is further contemplated that the blade 68 can be located radially below a shroud segment 156. The shroud segment 156 can be a plurality of shroud segments 156 circumferentially arranged around the blades 68.

Figure 5:
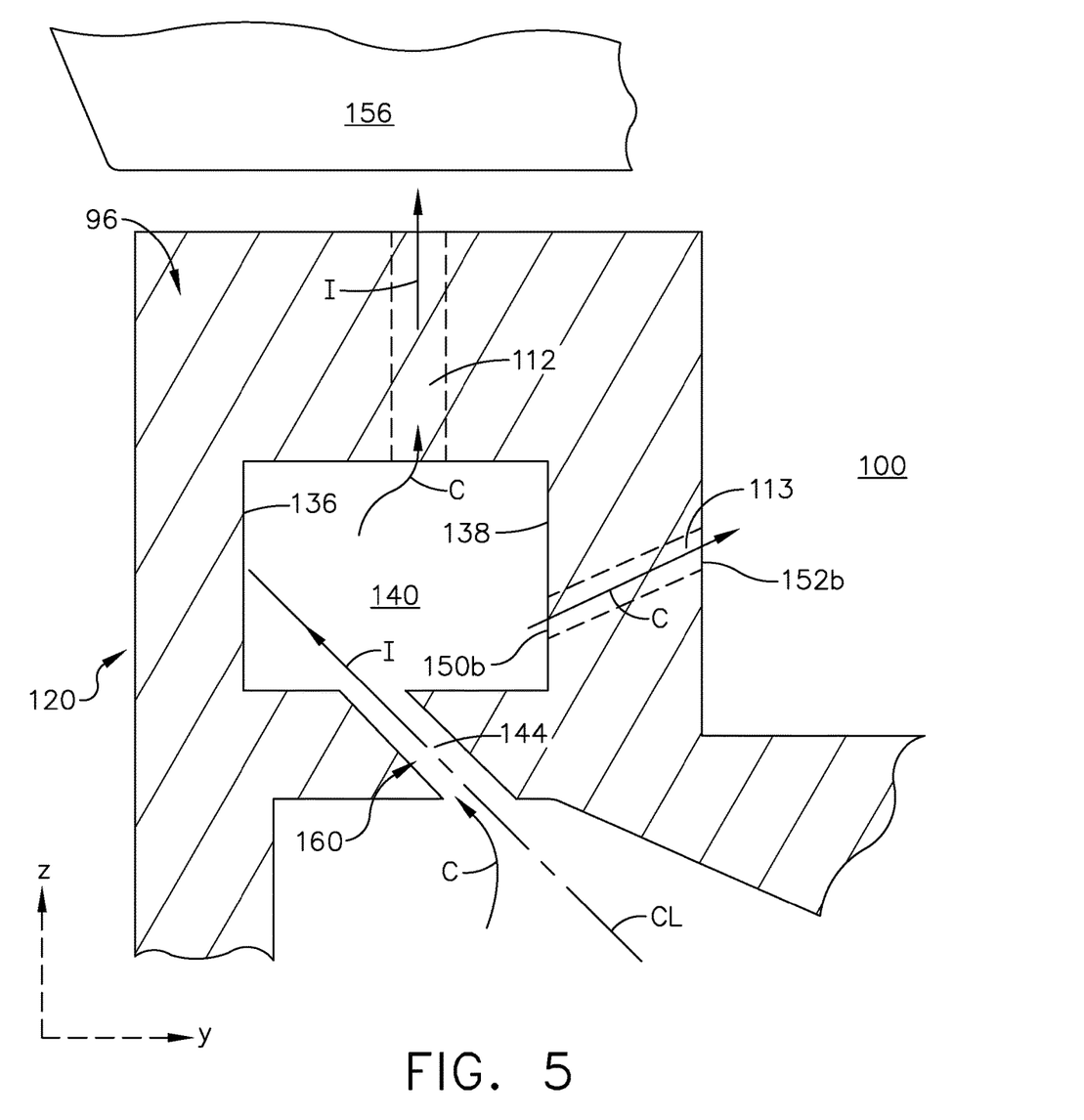
FIG. 5 is the section view from FIG. 4 illustrating a method of cooling the tip rail of the airfoil of FIG. 2.

Turning to FIG. 5 a method of cooling the tip rail 96 of the airfoil 88 is illustrated. Some numbers from FIG. 4 have been removed for clarity. The method includes impinging (I) a cooling fluid (C) through the cooling conduit 144 defining a flow path 160 onto the first surface 136 of the cooling cavity 140 within the tip rail 96. Then exhausting at least a portion of the cooling fluid (C) through the second set of film-holes 113 having the inlet 150b provided on the second surface 138 of the cooling cavity 140 opposite the first surface 136 and extending to the outlet 152b in the tip rail 96. The method can further include exhausting a remaining portion of cooling fluid (C) through the plurality of film-holes 112 and impinging (I) the remaining portion onto the shroud segment 156.

The cooling cavity 140 can extend along the entire tip rail 96. Cooling fluid (C) is fed from the cooling passage 119 of the blade 68, and can pass through numerous cooling conduits 144 to impinge against the set of walls 134 of the cooling cavity 140. The set of walls 134 defines a hole-free region upon which the cooling fluid (C) impinges. In this manner, dwell time within the cooling cavity 140 is extended as cooling fluid (C) travels along the hole-free region before exiting. Because impingement is effective at transferring heat and the region where the flow is impinging is typically quite hot, the impingement within the cooling cavity 140 can be an effective focused cooling technique. Thereafter, the cooling fluid is exhausted through a series of film-holes 112, 113 in the sides and top of the rail providing additional cooling to the tip rail 96.

Figure 6:
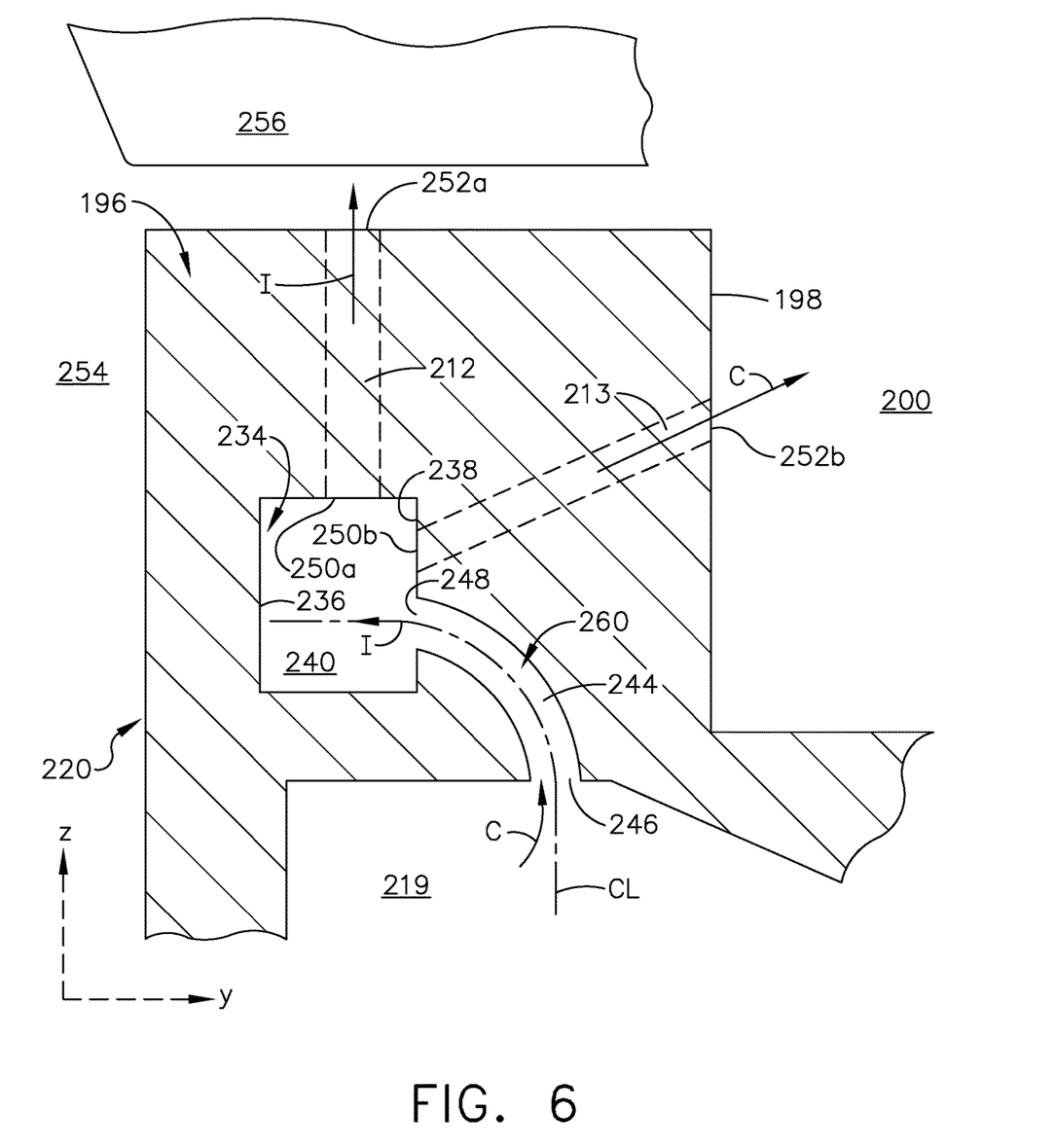
FIG. 6 is a section view of the tip rail of the airfoil of FIG. 2 taken across section IV-IV illustrating cooling cavities within the tip rail according to a second aspect of the disclosure described herein.

FIG. 6 illustrates a cooling cavity 240 according to another aspect of the disclosure described herein. The cooling cavity 240 has similarities to the cooling cavity 140, therefore, like parts will be identified with like numerals increased by 100. It should be understood that the description of the like parts of the cooling cavity 140 and surrounding features apply to those of the cooling cavity 240, unless otherwise noted.

A curved cooling conduit 244 having an inlet 246 fluidly coupled to the cooling passage 219 extends to an outlet 248 fluidly coupled to the at least one cooling cavity 240. The cooling conduit 244 is oriented such that a centerline (CL) of the curved cooling conduit 144 intersects with a first surface 236 of the at least one cooling cavity 240. The curved cooling conduit 244 can be curved such that the outlet 248 is formed on a second surface 238 opposite the first surface 236. It is contemplated that a plurality of cooling conduits 244 are formed between the cooling passage 219 and the at least one cooling cavity 240. It should be understood that the curved cooling conduit 244 can be formed in any manner or geometry where the centerline (CL) intersects the first surface 236 opposite the second surface 238.

A plurality of film-holes 212 fluidly couple the cooling conduit 240 to an air source 254 surrounding airfoil 88. The cooling cavity 240 includes a second set of film-holes 213 provided along an exterior surface 198 of a tip rail 96 that extend from a film-hole inlet 250*b* to a film-hole outlet 252*b*. The film-hole inlet 250*b* is fluidly coupled to cooling cavity 240 at the second surface 238 opposite the first surface 236. The film-hole outlet 252*b* is fluidly coupled to the air source 254 within tip plenum 200.

The method as described herein can further include impinging (I) a cooling fluid (C) through a curved cooling conduit 244 defining a flow path 260 onto the first surface 236 of the cooling cavity 240 within the tip rail 196.

Figure 7:
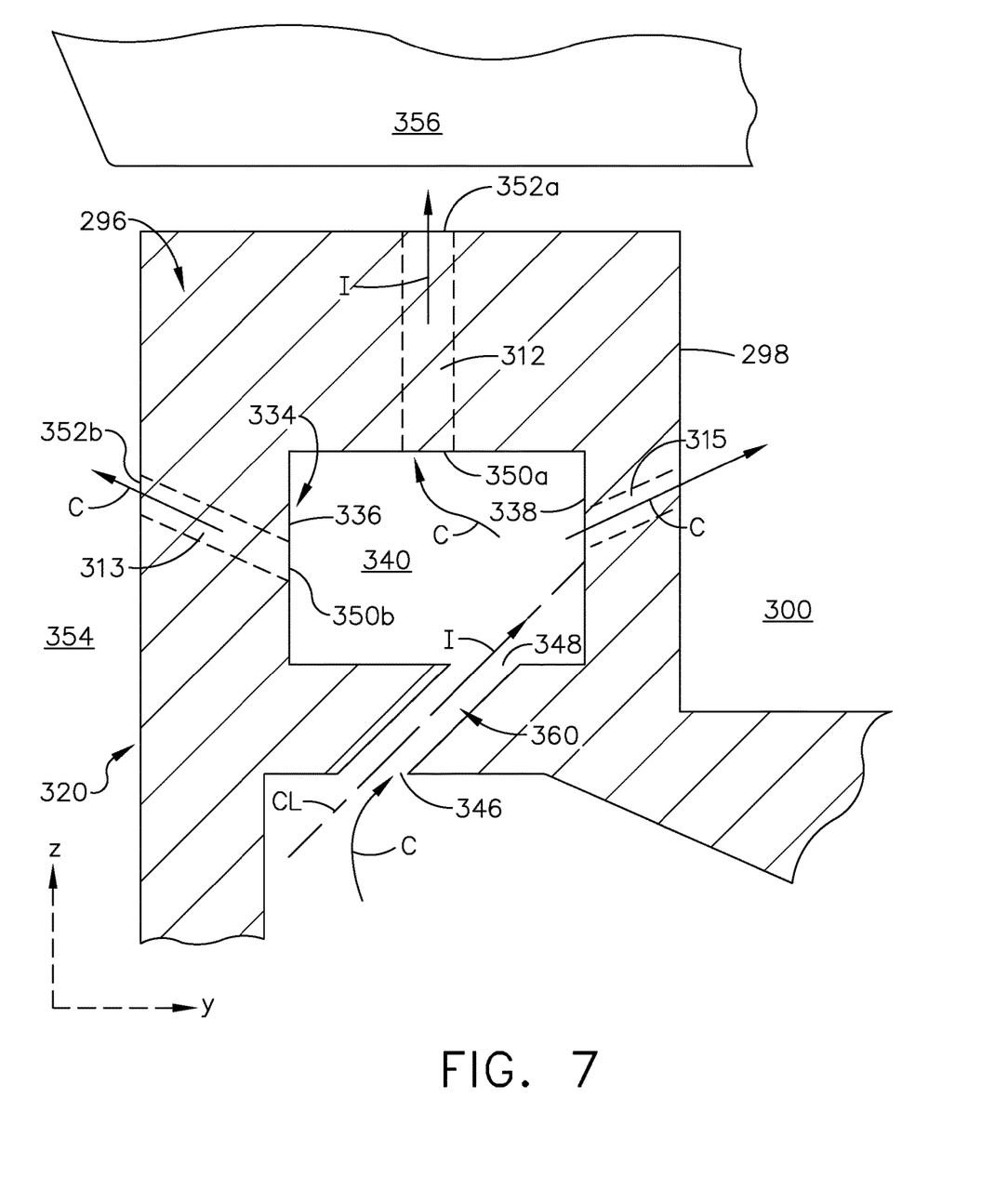
FIG. 7 is a section view of the tip rail of the airfoil of FIG. 2 taken across section IV-IV illustrating cooling cavities within the tip rail according to a third aspect of the disclosure described herein.

As can be seen in FIG. 7, a cooling cavity 340 according to another aspect of the disclosure is described herein. The cooling cavity 340 has similarities to the cooling cavity 140, therefore, like parts will be identified with like numerals increased by 200. It should be understood that the description of the like parts of the cooling cavity 140 and surrounding features apply to those of the cooling cavity 340, unless otherwise noted.

A cooling conduit 344 having an inlet 346 fluidly coupled to a cooling passage 319 extends to an outlet 348 fluidly coupled to the at least one cooling cavity 340. The cooling cavity 340 includes a set of walls 334 having a first surface 336 and a second surface 338 opposite the first surface 336. The cooling conduit 344 is oriented such that a centerline (CL) of the cooling conduit 344 intersects with a second surface 338 of the set of walls 334. It is contemplated that a plurality of cooling conduits 344 are formed between the cooling passage 319 and the at least one cooling cavity 340. It should be understood that the cooling conduit 344 can be formed in any manner or geometry where the centerline (CL) intersects the second surface 338 opposite the first surface 336.

A second set of film-holes 313 can be provided along an exterior surface 298 of tip rail 296 and can extend from a film-hole inlet 350*b* to a film-hole outlet 352*b*. The film-hole inlet 350*b* is fluidly coupled to cooling cavity 340 at the first surface 336. The film-hole outlet 352*b* is fluidly coupled to the air source 354 along an outer wall 320 of airfoil 288. It is further contemplated that a third set of film-holes 315 can include film-holes extending from the second surface 338 as depicted in examples already described herein. Providing a third set of film-holes 315 that fluidly couple the cooling cavity 340 to an outside air source 354 can be contemplated in any of the aforementioned exemplary tip rails 96, 196.

The method as described herein can further include impinging (I) a cooling fluid (C) through the cooling conduit 344 defining a flow path 360 onto the second surface 338 opposite the first surface 336 of the cooling cavity 340. In this manner the method described herein can also include exhausting the cooling fluid (C) through a second set of film-holes 313 located along the outer wall 320 of the airfoil 288.

Figure 8:
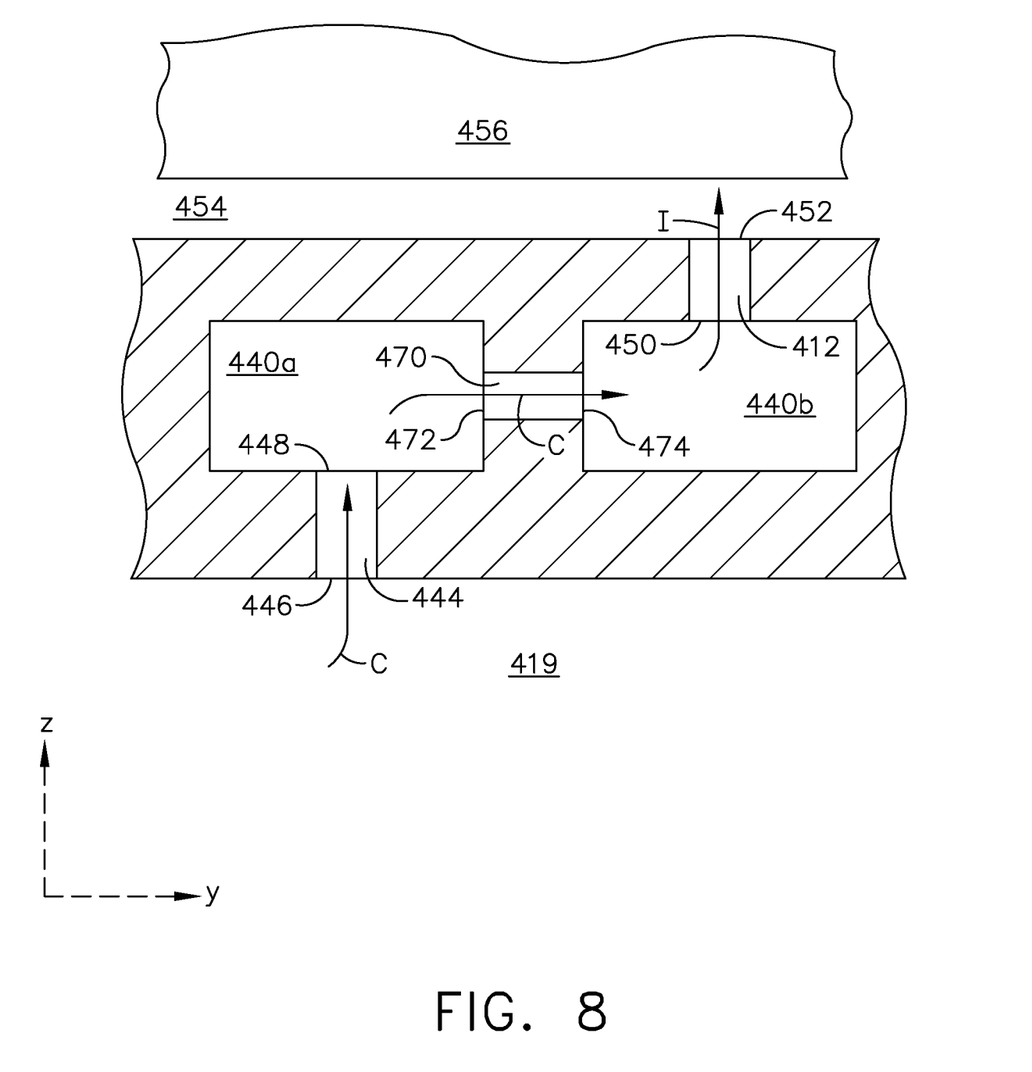
FIG. 8 is a is a section side view of the tip rail of the airfoil of FIG. 2 taken across section VIII-VIII illustrating cooling cavities within the tip rail according to a fourth aspect of the disclosure described herein.

In yet another aspect of the disclosure discussed herein as depicted in FIG. 8 a side cross-section taken across VIII-VIII of FIG. 2 depicts first and second axially-spaced cooling cavities 440*a*, 440*b*. The first cooling cavity 440*a* can include a cooling conduit 444 having an inlet 446 fluidly coupled to a cooling passage 419 and an outlet 448 fluidly coupled to the first cooling cavity 440*a*.

A connecting conduit 470, oriented primarily in an axial direction, can fluidly couple the first cavity 440*a* to the second cavity 440*b*. Film-holes 412 extending from a film-hole inlet 450 fluidly coupled to the second cavity 440*b* can fluidly couple the second cavity 440*b* to an exterior air source 454 via a film-hole outlet 452.

The method as discussed herein can further include flowing cooling fluid (C) through a connecting conduit 470 and then emitting the cooling fluid (C) through a film-hole 412 to impinge (I) the cooling fluid (C) onto a shroud 456 to cool the shroud 456.

While illustrated as two cavities, it should be understood that the description and orientation of the conduits, film-holes, and cavities as described herein is for illustrative purposes and not meant to be limiting. For example each of the axially-spaced cavities could include three or more axially-spaced cavities each fluidly coupled to proximate cooling cavities via additional cooling conduits. It is further contemplated that the second set of film-holes can extend out of the page from any of the axially-spaced cavities. The arrangement of cooling cavities as illustrated in FIG. 8 can be applied to the arrangements discussed regarding FIG. 4, FIG. 6 and FIG. 7 or in any combination discussed herein.

Furthermore, the film-holes and second set of holes as discussed herein are not limited to straight holes. Film holes can be curved or can be angled to cool the sides of the rail. Film holes can also include additional features including but not limited to shaping to improve cooling effectiveness.

Benefits associated with the disclosure described herein relate to impinging cooling fluid within a cooling cavity located in the tip rail of a blade. Impingement is known to be an effective method of removing heat in other regions of hot gas components, by way of non-limiting example in a leading edge of the airfoil. The disclosure herein uses a cavity to enable impingement inside of the tip rail. Any post-impingement flow is then exhausted through the sides and top of the rail, providing additional cooling to those areas.

The second set of cooling holes is necessary to allow cooling fluid to still pass through the cooling cavity even in the event that the top film-holes plug from the tip rail rubbing against the shroud. Additionally, the disclosure as discussed herein includes impinging twice, once against a surface opposite the sequential inlet for the cooling fluid and then again against a second surface in an additional cooling cavity to extract more heat from the tip rail.

Additional benefits include increasing the effectiveness of cooling in the tip rail region, which results in the engine being more efficient. This can be accomplished by increasing firing temperature or reducing cooling flow. Furthermore, more effective cooling can extend part life and reduce the likelihood of unplanned outages.

To the extent not already described, the different features and structures of the various embodiments can be used in combination with each other as desired. That one feature is not illustrated in all of the embodiments is not meant to be construed that it cannot be, but is done for brevity of description. Thus, the various features of the different embodiments can be mixed and matched as desired to form new embodiments, whether or not the new embodiments are expressly described. All combinations or permutations of features described herein are covered by this disclosure.

It should be appreciated that application of the disclosed design is not limited to turbine engines with fan and booster sections, but is applicable to turbojets and turbo engines as well.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An airfoil for a turbine engine, the airfoil comprising:
    a body defining an interior, and extending axially between a leading edge and a trailing edge to define a chord-wise direction and radially between a root and a tip to define a span-wise direction, which terminates in a tip wall and a tip rail extending from the tip wall;
    at least one cooling passage formed in the interior;
    at least one cooling cavity provided within the tip rail and comprising at least one cooling conduit defining a flow path having a centerline intersecting with a first surface of the cooling cavity and fluidly coupled to the cooling passage; and
    at least one film-hole extending in a separate plane from, and non-aligned in the chord-wise direction with, the at least one cooling conduit having an inlet fluidly coupled to the at least one cooling cavity at a second surface opposite the first surface and an outlet provided on an exterior surface of the tip rail.

2. The airfoil of claim 1 wherein the at least one cooling cavity comprises multiple cooling cavities.

3. The airfoil of claim 2 wherein the at least one cooling conduit comprises multiple cooling conduits.

4. The airfoil of claim 1 wherein the at least one cooling conduit comprises a curved cooling conduit.

5. The airfoil of claim 4 wherein the at least one cooling conduit comprises multiple cooling conduits.

6. The airfoil of claim 1 wherein the at least one cooling conduit comprises multiple cooling conduits.

7. The airfoil of claim 1 further comprising a plurality of film-holes provided along a distal end of the tip rail.

8. The airfoil of claim 1 wherein the exterior surface comprises an outer wall and the outlet is fluidly coupled to a source of air at the outer wall.

9. The airfoil of claim 1 wherein the exterior surface defines a tip plenum and the outlet is fluidly coupled to the tip plenum.

10. The airfoil of claim 1 wherein the cooling cavity extends along a length of the tip rail.

11. The airfoil of claim 1 wherein the cooling cavity comprises axially-spaced cooling cavities.

12. The airfoil of claim 1 wherein the at least one film-hole is multiple film-holes comprising a first and second set of film holes.

13. The airfoil of claim 12 wherein the multiple film-holes includes a third set of film-holes.

14. A blade for a turbine engine, the blade comprising:
    a body defining an interior, and extending axially between a leading edge and a trailing edge to define a chord-wise direction and radially between a root and a tip to define a span-wise direction, which terminates in a tip wall and a tip rail extending from the tip wall;
    at least one cooling passage formed in the interior;
    at least one cooling cavity provided within the tip rail and comprising at least one cooling conduit defining a flow path having a centerline intersecting with a first surface defining a hole-free region of the cooling cavity and fluidly coupled to the cooling passage; and
    at least one film-hole with the at least one cooling conduit having an inlet fluidly coupled to the at least one cooling cavity at a second surface opposite the first surface and an outlet provided on an exterior surface of the tip rail.

15. The blade of claim 14 wherein the at least one cooling cavity comprises multiple cooling cavities.

16. The blade of claim 15 wherein the at least one cooling conduit comprises multiple cooling conduits.

17. The blade of claim 14 wherein the at least one cooling conduit comprises a curved cooling conduit.

18. The blade of claim 17 wherein the at least one cooling conduit comprises multiple cooling conduits.

19. The blade of claim 14 wherein the at least one cooling conduit comprises multiple cooling conduits.

20. The blade of claim 14 further comprising a plurality of film-holes provided along a distal end of the tip rail.

21. The blade of claim 14 wherein the exterior surface comprises an outer wall and the outlet is fluidly coupled to a source of air at the outer wall.

22. The blade of claim 14 wherein the exterior surface defines a tip plenum and the outlet is fluidly coupled to the tip plenum.

23. The blade of claim 14 wherein the cooling cavity extends along a length of the tip rail.

24. The blade of claim 14 wherein the cooling cavity comprises axially-spaced cooling cavities.

25. The blade of claim 14 wherein the at least one film-hole is multiple film-holes comprising a first and second set of film holes.

26. The blade of claim 25 wherein the multiple film-holes includes a third set of film-holes.

27. A method of cooling a tip rail of an airfoil for a turbine engine, the method comprising:
    impinging a cooling fluid through a flow path onto a first surface defining a hole-free region of a cooling cavity within the tip rail; and
    exhausting at least a portion of cooling fluid through at least one film-hole having an inlet provided on a second surface of the cooling cavity opposite the first surface and extending to an outlet in the tip rail.

28. The method of claim 27 wherein the impinging a cooling fluid further includes impinging the cooling fluid through a curved cooling conduit.

29. The method of claim 27 wherein the exhausting at least a portion of cooling fluid includes exhausting a remaining portion of cooling fluid through a plurality of film-holes.

30. The method of claim 29 further including impinging the remaining portion of cooling fluid onto a shroud segment.

31. The method of claim 27 wherein the exhausting at least a portion of cooling fluid includes exhausting the cooling fluid through at least one film-hole located along an outer wall of the airfoil.

32. The method of claim 27 wherein the exhausting at least a portion of cooling fluid includes exhausting the cooling fluid through a second set of film-holes located along a surface differing from the at least one film-hole.

* * * * *